US008491287B2

(12) United States Patent
Murai et al.

(10) Patent No.: US 8,491,287 B2
(45) Date of Patent: Jul. 23, 2013

(54) PISTON PUMP

(75) Inventors: Kazuyuki Murai, Kariya (JP); Tomoo Harada, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 469 days.

(21) Appl. No.: 12/706,271

(22) Filed: Feb. 16, 2010

(65) Prior Publication Data
US 2010/0209273 A1 Aug. 19, 2010

(30) Foreign Application Priority Data

Feb. 18, 2009 (JP) ................................ 2009-035262

(51) Int. Cl.
*F04B 53/12* (2006.01)
(52) U.S. Cl.
USPC ........... 417/553; 417/549; 417/546; 417/545; 92/183; 92/250
(58) Field of Classification Search
USPC ................. 417/545, 546, 549, 553, 495, 552, 417/554; 92/183, 250
See application file for complete search history.

(56) References Cited

U.S. PATENT DOCUMENTS

| 5,320,498 | A | * | 6/1994 | Fuchida | 417/214 |
| 5,577,896 | A | * | 11/1996 | Harada | 417/259 |
| 8,011,906 | B2 | * | 9/2011 | Harada | 417/546 |
| 8,028,862 | B2 | * | 10/2011 | Rossignol | 222/256 |
| 2008/0206081 | A1 | | 8/2008 | Harada | |

FOREIGN PATENT DOCUMENTS

JP 3278982 B2 4/2002
JP 2008-208788 A 9/2008

* cited by examiner

*Primary Examiner* — Charles Freay
*Assistant Examiner* — Christopher Bobish
(74) *Attorney, Agent, or Firm* — Buchanan Ingersoll & Rooney P.C.

(57) ABSTRACT

A piston pump includes a pump mechanism configured to compress fluid sucked from an inlet port by increasing or decreasing a volume of a pump chamber which faces a front end of a piston by reciprocating the piston housed in a housing, a feed mechanism including a feed ring mounted to an annular groove provided at an outer periphery of the piston and following a motion of the piston, a feed chamber formed between the feed ring and the housing, and a valve portion. The piston pump includes a pressure wall provided at the piston and configured to contact the feed ring to axially move the feed ring, and a restriction portion provided at the feed ring and configured to engage with an outer periphery of the piston at a position approximate to the pressure wall for restricting a radial displacement of the feed ring on the piston.

12 Claims, 6 Drawing Sheets

PISTON PUMP

CROSS REFERENCE TO RELATED APPLICATIONS

This application is based on and claims priority under 35 U.S.C. §119 to Japanese Patent Application 2009-035262, filed on Feb. 18, 2009, the entire content of which is incorporated herein by reference.

FIELD OF THE INVENTION

This disclosure relates to a piston pump which serves as a source of hydraulic pressure. More particularly, this disclosure pertains to a piston pump having a self-suction function for pumping a fluid into a pump chamber thereof.

BACKGROUND

JP3278982B (Patent reference 1) and JP2008-208788A (Patent reference 2) disclose known piston pumps which pump fluid (brake fluid) to be sucked into a pump chamber by itself and are adopted to a brake hydraulic pressure control apparatus for a vehicle which has an electronic control function such as an ESC (electronic stability control).

The known piston pumps disclosed in Patent reference 1 and Patent reference 2 include an annular groove provided at an outer periphery of a piston whose one end (a front end) faces the pump chamber, a feed ring mounted to the annular groove, a feed chamber formed between the feed ring and a housing which houses the piston, and a valve portion formed between the piston and the feed ring for opening and closing an inlet side passage of the feed chamber by contacting the feed ring to a lateral surface of the annular groove (groove surface). The valve portion is closed during an intake stroke by the piston, and a volume of the feed chamber is reduced so that the fluid flowed in the feed chamber is pumped into the pump chamber.

Here, an end portion of the piston which faces the pump chamber is defined as a front end of the piston and an opposite end portion is defined as a rear end of the piston. Further, an axial direction and a radial direction here correspond to an axial direction and a radial direction of the piston, respectively.

The piston pump disclosed in Patent reference 1 includes a passage formed between a bottom of the annular groove provided on the piston and an inner peripheral surface of the feed ring. According to the disclosure, a fluid sucked through the valve portion flows into the passage via an inlet port during a compression stroke of the piston, and thereafter, the fluid is introduced to the feed chamber via a passage formed within the piston.

Further, according to the piston pump disclosed in Patent reference 2, a slit, which allows a passage provided between the annular groove and an outer periphery of the piston to communicate with the feed chamber, is formed on the feed ring. According to the disclosure, by providing a path for introducing the fluid to the feed chamber via the slit in addition to a path provided inside the piston for introducing the fluid to the feed chamber, an intake path for the feed chamber is expanded.

As explained above, the piston pumps disclosed in Patent reference 1 and Patent reference 2, or the like, include the passage for flowing the fluid between the bottom of the annular groove formed on the piston and the inner peripheral surface of the feed ring. According to the foregoing construction, a radial gap corresponding to the dimension of the passage is generated between the piston and the feed ring. Thus, a radial displacement (positional displacement) of the feed ring from the center of the piston is allowed, which makes it difficult to assemble the piston and the feed ring to the housing because of the radial displacement of the feed ring.

The feed ring is mounted to the annular groove of the outer periphery of the piston in advance, and both the feed ring and the piston are simultaneously inserted into an assembling hole provided at the housing to be assembled to the housing. In those circumstances, in a case where the feed ring is configured to be displaced in a radial direction from the center of the piston, a portion of the feed ring may be caught at an opening of the assembling hole or at a stepped portion provided inside the assembling hole when inserting the piston into the housing. Thus, the piston may not to be introduced into the assembling hole in a right manner, thereby undermining an assembling performance.

Further, in a case where the piston is forced into the housing, the feed ring may be damaged by the piston and the housing therebetween.

A need thus exists for a piston pump which is not susceptible to the drawback mentioned above (A need thus exists for a piston pump which includes a feed ring outfitted to an outer periphery of a piston and pumps fluid of a feed chamber into a pump chamber during an intake stroke by the piston, and which enhances an assembility of the piston and the feed ring to the housing by enabling a retention of the feed ring at the center of the piston).

SUMMARY OF THE INVENTION

In light of the foregoing, the present invention provides a piston pump, which includes a pump mechanism configured to compress fluid sucked from an inlet port by increasing or decreasing a volume of a pump chamber which faces a front end of a piston by reciprocating the piston housed in a housing, the pump mechanism configured to discharge the compressed fluid from an outlet port, a feed mechanism including a feed ring mounted to an annular groove provided at an outer periphery of the piston and following a motion of the piston, a feed chamber formed between the feed ring and the housing, and a valve portion selectively opening and closing an inlet side passage of the feed chamber by selectively contacting and separating the feed ring and the piston. The feed mechanism is provided at an intake passage which is configured to communicate the intake port with the pump chamber, a portion of the intake passage is formed between an inner peripheral surface of the feed ring and a bottom of the annular groove, the valve portion is closed and the volume of the feed chamber is reduced to pressure-feed the fluid in the feed chamber into the pump chamber during an intake stroke by the piston. The piston pump includes a pressure wall provided at the piston and configured to contact the feed ring to axially move the feed ring, and a restriction portion provided at the feed ring and configured to engage with an outer periphery of the piston at a position approximate to the pressure wall for restricting a radial displacement of the feed ring on the piston.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
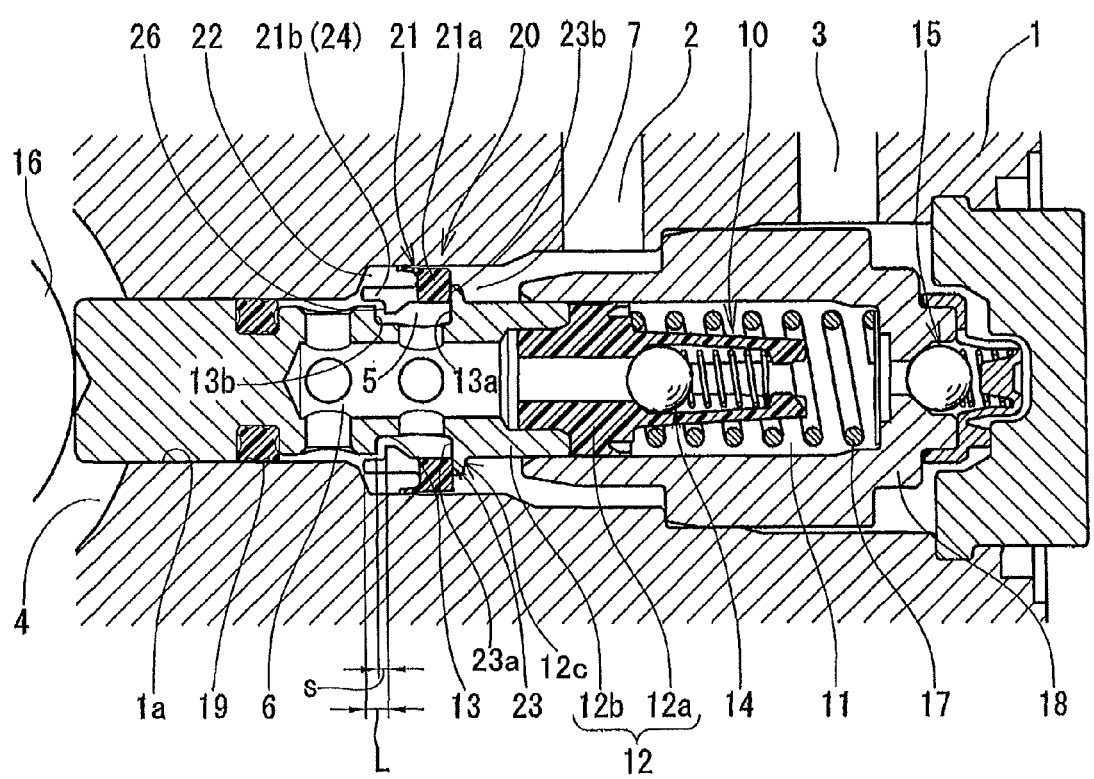
FIG. 1 is a cross-sectional view of a piston pump at a position where an intake stroke is completed according to a first embodiment disclosed here.
Figure 2:
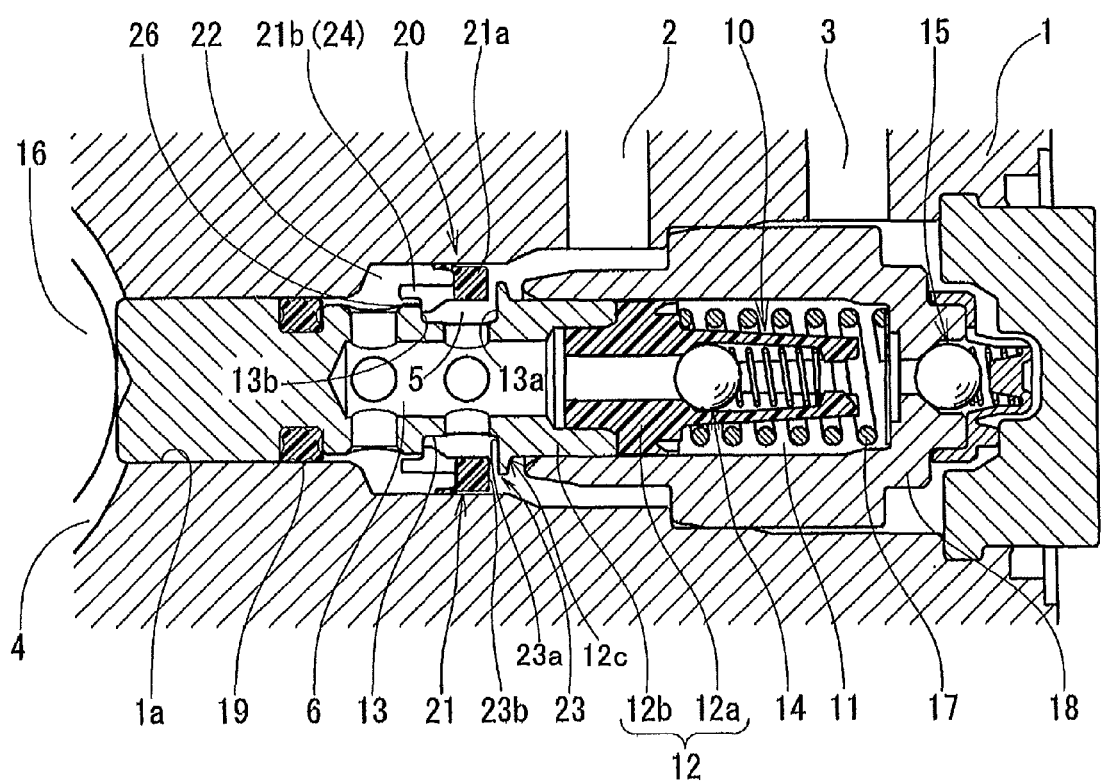
FIG. 2 is a cross-sectional view of the piston pump at a position where a compression stroke is completed according to the first embodiment disclosed here.

Embodiments of a piston pump will be explained with reference to illustrations of drawing figures as follows. A piston pump of a first embodiment will be explained referring to FIGS. 1 to 4. As shown in FIGS. 1 and 2, the piston pump includes a pump mechanism 10 and a feed mechanism 20 provided inside a housing 1. The housing 1 includes an inlet port 2 and an outlet port 3 which are configured to communicate with a pump chamber 11.

The pump mechanism 10 includes the pump chamber 11 provided inside the housing 1, a piston 12 assembled inside the housing 1 so as to be slidable in an axial direction so that a front end thereof faces the pump chamber 11, an intake valve 14 provided at a mouth portion of the pump chamber 11, an eccentric cam 16 actuating the piston 12, and a return spring 17 for the piston 12.

Here, an end portion of the piston 12 which faces the pump chamber 11 is defined as a front end of the piston and an opposite end portion is defined as a rear end of the piston 12. Further, an axial direction and a radial direction here correspond to an axial direction and a radial direction of the piston 12, respectively.

The pump chamber 11 is formed at a cylinder member 18 which is assembled inside the housing 1. The eccentric cam 16 is positioned in an ambient chamber 4 formed at the housing 1. The piston 12 includes a front piece 12a and a rear piece 12b which are connected to one another. The front piece 12a which is made of resin is fluid tightly inserted within the cylinder member 18. An outer periphery of the rear piece 12b, which is guided by the housing 1, and the housing 1 (i.e., between the outer periphery of the rear piece 12b and an inner peripheral surface of a piston guide portion of an assembling hole 1a) are fluid tightly sealed by a sealing member 19.

The eccentric cam 16 mounted to a drive shaft pushes the piston 12 to move to the pump chamber 11. The piston 12 moved to the pump chamber 11 is returned by the return spring 17. The piston 12 reciprocates by repeating the foregoing movements. A volume of the pump chamber 11 changes (increases or decreases) by the reciprocating movement of the piston 12 to suck or discharge the fluid (e.g., brake fluid).

The piston 12 includes an annular groove 13 at an outer periphery thereof and a passage 6 which includes a longitudinal hole formed at an axial center portion of the piston 12 and transversal holes which are in communication with the longitudinal hole and open to an outer peripheral surface of the piston 12.

Known valves are applied for the intake valve 14 and the outlet valve 15. Thus, explanations for the construction of the intake valve 14 and the outlet valve 15 will be omitted.

The feed mechanism 20 is provided at an intake passage 7 which establishes a communication between the inlet port 2 and the pump chamber 11. The feed mechanism 20 includes a feed ring 21 which is provided at the annular groove 13 provided at the outer periphery of the piston 12 (e.g., an outer periphery of the rear piece 12b) and is configured to move following the movement of the piston 12, a feed chamber 22 which is formed between the feed ring 21 and the housing 1, and a valve portion 23 selectively opens and closes an inlet side passage of the feed chamber 22.

Figure 3:
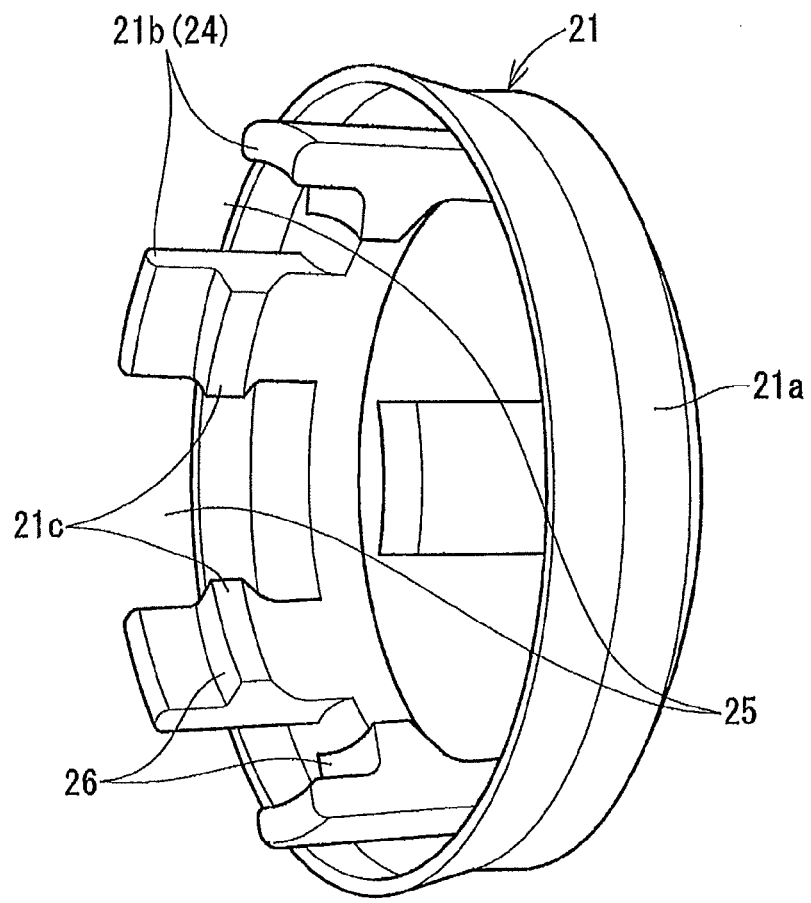
FIG. 3 is a perspective view of a feed ring adopted to the piston pump disclosed in FIG. 1.

A cup seal, for example, is applied as the feed ring 21 as shown in FIG. 3. The feed ring 21 is, for example, made of soft resin having oil resistance which is advantageous for enhancing the strength and anti-abrasion performance of a restricting portion.

An inner diameter of the feed ring 21 is greater than a diameter of a bottom portion of the annular groove 13 and a passage 5 serving as an intake passage for the fluid is formed between an inner peripheral surface of the feed ring 21 and the bottom of the annular groove 13. The greater the inner diameter of the feed ring 21 is, the greater a dimension of the passage 5 becomes, which is preferable to expand the passage dimension. However, the greater the inner diameter of the feed ring 21 becomes, the greater a gap between the inner peripheral surface of the feed ring 21 and the bottom of the annular groove 13 becomes, and thus an allowable radial displacement amount of the feed rings 21 from a center of the piston becomes greater.

Figure 4:
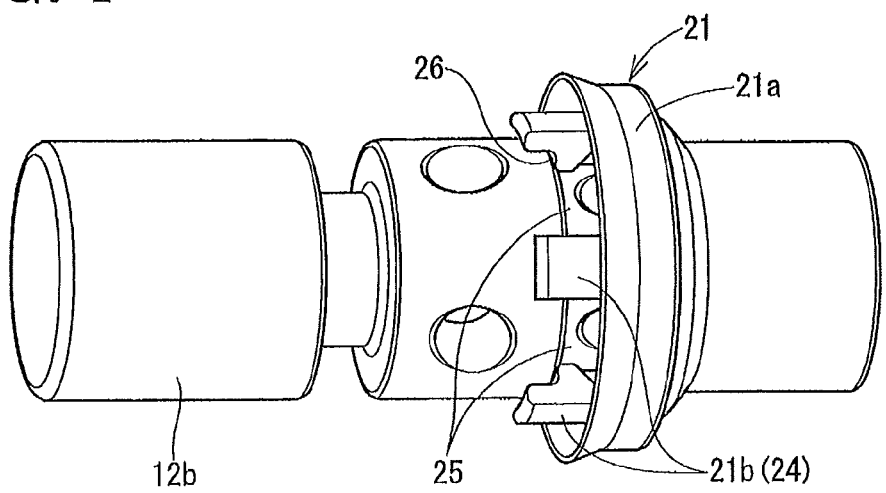
FIG. 4 is a perspective view of the piston and the feed ring where the feed ring is mounted to a rear piece of the piston.

A restriction portion 24 for restraining the radial displacement of the feed ring 21 is provided at the feed ring 21 adapted to the piston pump according to the embodiment. The restriction portion 24 includes plural (e.g., equal to or more than three) pawls 21b. Each of the pawls 21b is formed protruding from an annular base portion 21a of the feed ring 21 to a rearward of the piston 12 to be parallel to an axis of the feed ring 21. The plural pawls 21b are arranged at intervals in a circumferential direction. As shown in FIG. 4, the restriction portion 24 (pawls 21b) is configured to be engaged with an outer peripheral surface of the piston 12 to restrict the radial displacement of the feed ring 21 from the center of the piston 12. According to the foregoing construction, even if the piston 12 is laid after attaching the feed ring 21 to the piston 12, the feed ring 21 is retained approximately coaxially to the piston 12. Thus, a portion of the feed ring 21 will not be dislocated from the annular groove, and thus the assembling performance will not be declined.

Clearances 25 (see FIG. 3) provided between the pawls 21b serving as the restriction portion 24 establish the communication between the passage 5 and the feed chamber 22. The passage 5 is also in communication with the passage 6 formed inside the piston. Fluids are sucked into the feed chamber 22 via the passage 6 by way of an inside of the piston 12 and via passages formed through the clearances 25 formed between the pawls 21b.

As shown in FIG. 1, two lateral surfaces of the annular groove 13 facing each other of the piston pump are applied as pressure walls 13a, 13b. The feed ring 21 is pushed to move in an axial direction by the pressure walls 13a, 13b. The pressure wall 13b of the annular groove 13 at a rear portion side of the piston is configured to contact a wall 26 which is to be pressured. The wall 26 to be pressured is formed on the pawl 21b at an intermediate portion in an axial direction of a radial inner surface of the pawl 21b and also serves as an engaging portion for a snap fit which fits in the annular groove 13. The forward thrust force of the piston 12 is transmitted to the feed ring 21 via the wall 26 to be pressured, and the feed ring 21 follows the forward movement of the piston 12.

The pressure wall 13a of the annular groove 13 at a front portion side of the piston also serves as a seat surface of the valve portion 23 and is configured to open and close the valve portion 23 by selectively contacting or separating from a feed ring side seat surface 23b which is constructed with an end surface of the annular base portion 21a of the feed ring at a front portion side of the piston (i.e., right side in FIG. 1). By providing a flange 12c which includes a piston side seat surface 23a of the valve portion 23 at an outer periphery positioned close to the front portion side of the piston 12 compared to the annular groove 13, the inner diameter of the feed ring is expanded, thus increasing a cross sectional dimension of the passage 5.

An axial clearance for allowing the feed ring 21 to stroke in order to open and close the valve portion 23 is provided between the feed ring 21 and the pressure walls 13a, 13b which are formed with two lateral surfaces of the annular groove 13 which face each other. An axial length L of a portion of the pawl 21b which is configured to engage with an outer peripheral surface of the piston (a portion extending in a rearward direction of the piston from the position of the wall 26 to be pressured) is defined to be greater than an axial moving stroke s which the feed ring 21 is allowed by the clearance to stroke in the annular groove 13. According to the foregoing construction, the restriction portion 24 is always retained at the position to come to engage with the outer periphery of the piston.

The piston 12 and the feed ring 21 are assembled to the housing 1 by inserting the piston 12 from the rearward to an assembling hole 1a. Thus, the piston 12 may be inserted into the assembling hole 1a while the feed ring 21 mounted to the outer periphery of the piston is caught at a stepped portion inside the assembling hole and an opening, or mouth portion of the assembling hole 1a. However, even if the feed ring 21 moves by the distance s in the annular groove 13, the restriction portion 24 is retained at the position to come to engage with the outer periphery of the piston, and thus the restriction portion 24 prevents the radial positional displacement of the feed ring 21.

Figure 5:
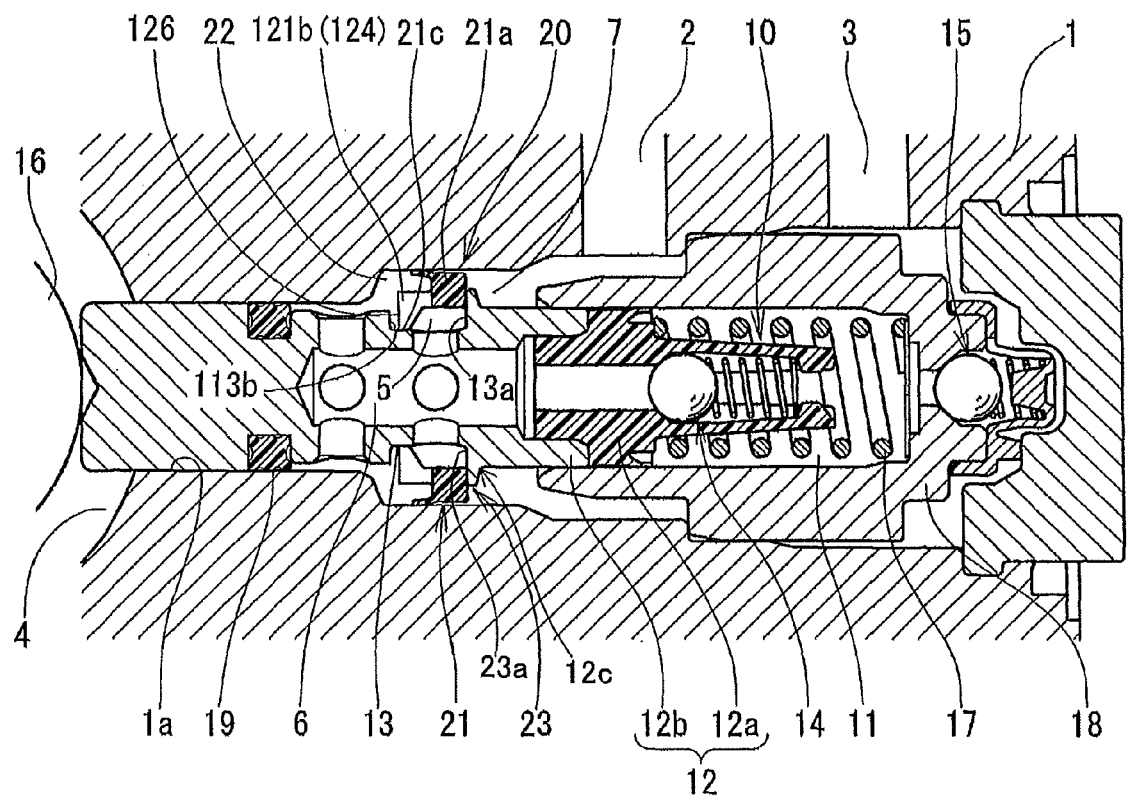
FIG. 5 is a cross-sectional view of a piston pump according to a second embodiment disclosed here.
Figure 6:
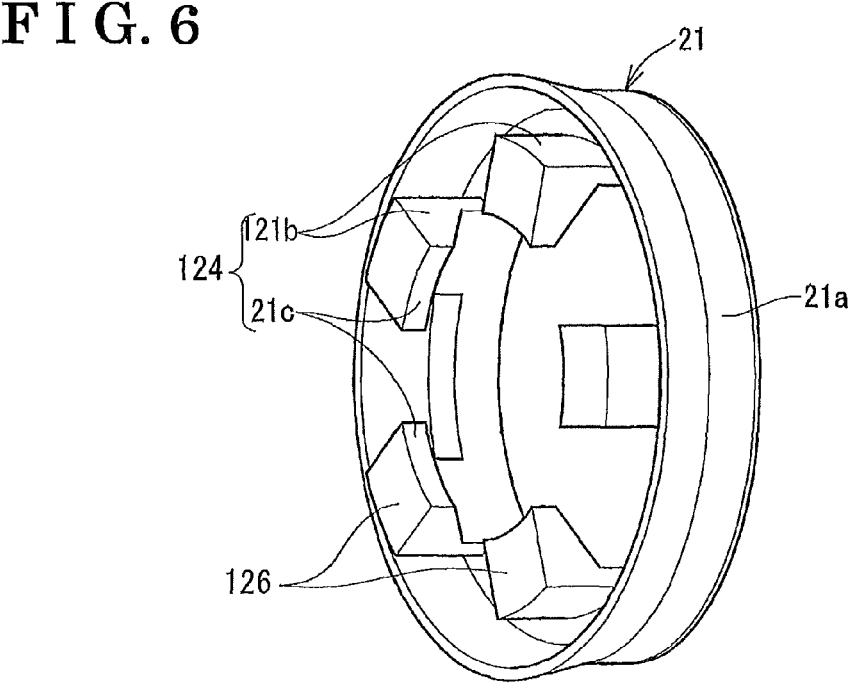
FIG. 6 is a perspective view of a feed ring adopted to the piston pump disclosed in FIG. 5.

A second embodiment of the piston pump will be explained hereinafter. The restriction portion 24 of the piston pump shown in FIG. 1 according to the first embodiment is configured to be engaged with the outer periphery of the piston 12. The radial positional displacement of the feed ring 21 from the center of the piston can also be prevented with a structure that the restriction portion 24 of the piston pump is configured to be engaged with the bottom of the annular groove 13 provided at the piston 12. The second embodiment of the piston pump with the foregoing structure is shown in FIGS. 5 and 6.

According to the second embodiment, likewise the first embodiment, a restriction portion 124 which restricts the radial displacement of the feed ring 21 includes plural pawls 121b which are formed projecting from the annular base portion 21a of the feed ring 21 in a rearward direction of the piston 12 to be in parallel to the axial center of the piston 12. Each of the pawls 121b includes a protruding portion 21c formed on a projecting end thereof and protruding radially inward (i.e., the protruding portion 21c also serves as an engaging portion for a snap fit) to fit in the annular groove 13. The protruding portion 21c formed on the pawl 121b is configured to contact the bottom of the annular groove 13 to restrict the radial displacement of the feed ring 21 from the center of the piston 12.

According to the second embodiment, a lateral surface of the annular groove 13 at a rear portion side of the piston serves as a pressure wall 113b and a protruding end of the pawl 121b serves as a wall 126 to be pressured so that the forward thrust force of the piston 12 is transmitted to the feed ring 21. Other constructions are common to those of the first embodiment, the same numerals are applied to the same structure and the explanations will not be repeated.

A third embodiment will be explained with reference to FIGS. 7 and 8. According to the first embodiment, the pawl 21b (restriction portion 24) extends from the annular base portion 21a of the feed ring 21 in the rearward direction of the piston 12. According to the third embodiment, pawls 221b protrude in the forward direction of the piston 12 as shown in FIG. 7.

By providing a flange 12c which includes a piston side seat surface 23a of the valve portion 23 at an outer periphery positioned close to the front portion side of the piston 12 compared to the annular groove 13, the inner diameter of the feed ring is expanded, thus increasing a cross sectional dimension of the passage 5. According to the third embodiment, the flange 12c is provided and the pawls 221b are provided at positions so as to come in contact with an outer peripheral surface of the flange 12c. Accordingly, with the construction of the third embodiment, the cross-sectional dimension of the passage of the inner radial side of the feed ring is increased by forming the piston side seat surface 23a of the valve portion 23 while preventing the radial displacement of the feed ring 21.

Further, according to the construction of the third embodiment, the axial length L of a portion of the pawl 221b which is configured to contact the outer periphery of the piston is defined to be greater than the axial moving stroke s which the feed ring 21 is allowed to stroke in the annular groove 13, thus the radial displacement of the feed ring 21 is securely restricted by the restriction portion 24.

Figure 7:
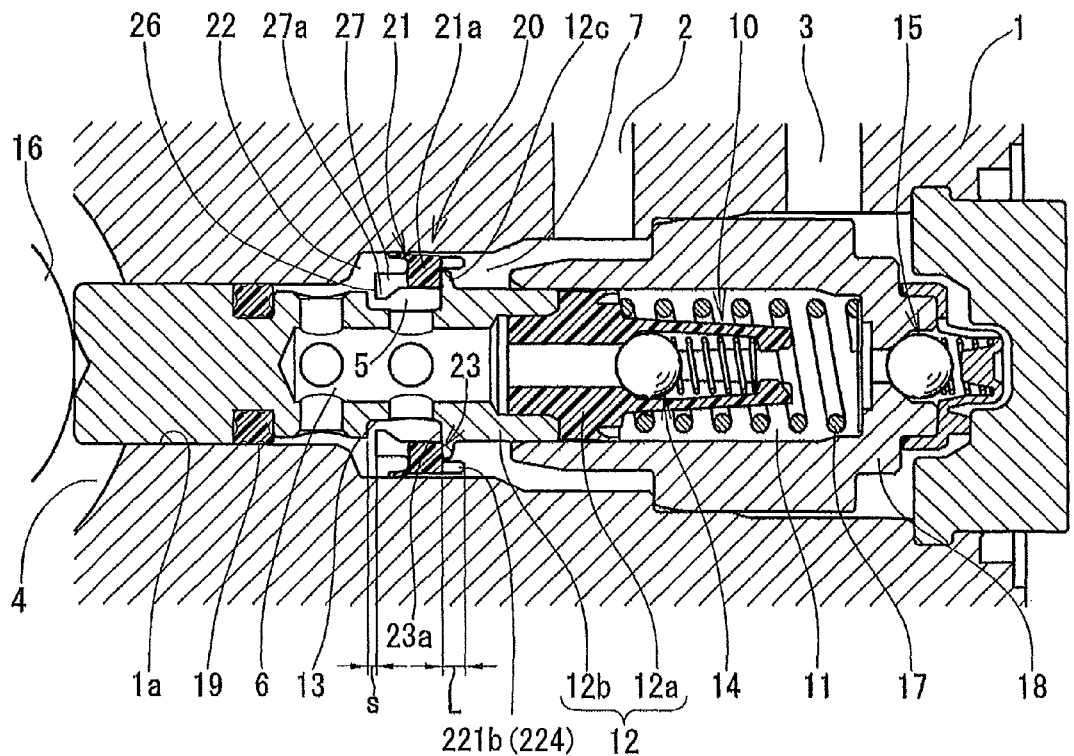
FIG. 7 is a cross-sectional view of a piston pump according to a third embodiment disclosed here.
Figure 8:
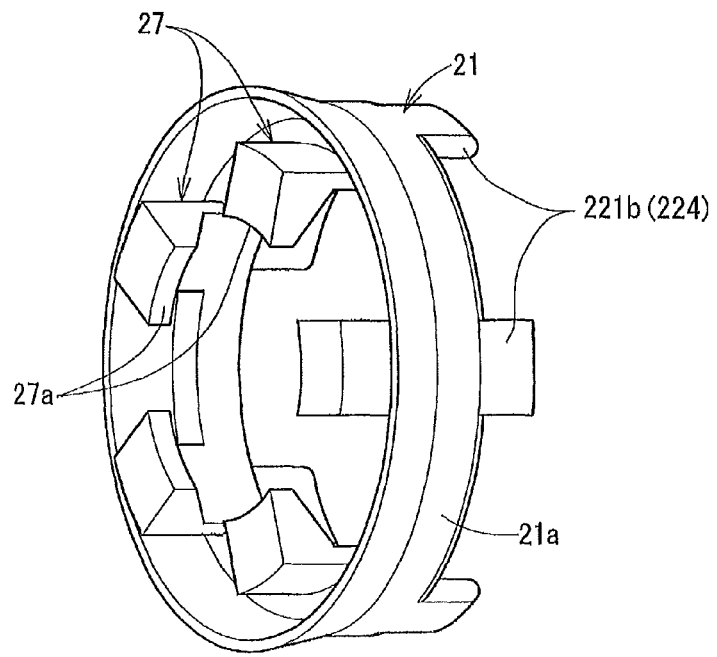
FIG. 8 is a perspective view of a feed ring adopted to the piston pump disclosed in FIG. 7.

As shown in FIGS. 7 and 8, the feed ring 21 includes an engaging portion 27 for a snap fit which is provided protruding to the rearward of the piston 12 from the annular base portion 21a of the feed ring 21 in place of the pawls 121b of the second embodiment shown in FIG. 5. Similar to the restriction portion 124 of the second embodiment, the engaging portion 27 includes plural pawls which are arranged at intervals in a circumferential direction. However, the height of a protruding portion 27a provided at a protruding end of the pawl (i.e., projecting amount in the radially inward direction) is lower than the height of the protruding portion 21c disclosed in FIG. 5. The protruding portion 27a is defined to have a height necessary to engage the feed ring 21 with the annular groove 13 and is not configured to restrict the radial displacement of the feed ring 21 from the center of the piston.

According to the construction of the third embodiment, because the engaging portion 27 does not have to be configured to restrict the radial displacement of the feed ring 21, the height of the protruding portion 27a can be lowered compared to the construction of the second embodiment shown in FIG. 5, an elastic deforming amount (expanding amount of radius) when mounting the feed ring 21 to the annular groove 13 is reduced to reduce a degree of influence on a durability of the feed ring.

Further, because the height of the protruding portion 27a is lowered, in a case where the feed ring 21 is made of a material which is readily elastically deformed, for example, rubber, the engaging portion 27 may be annularly formed. In those circumstances, holes for establishing the communication between the passage 5 and the feed chamber 22 are formed on the annular engaging portion.

Figure 9:
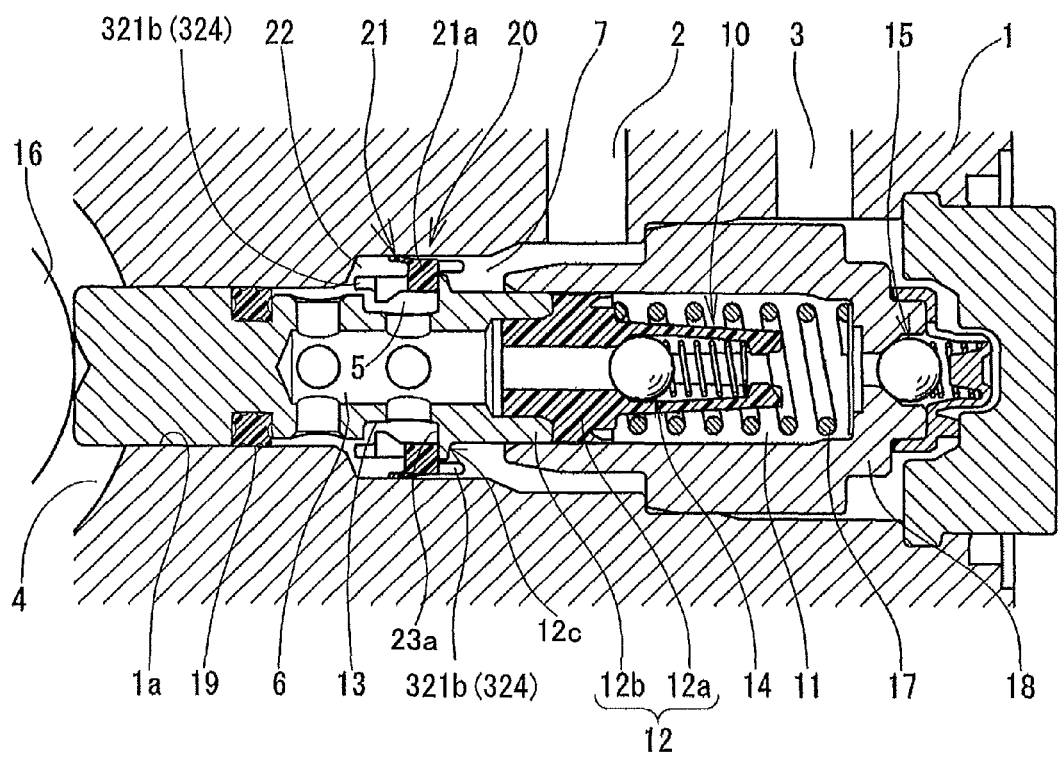
FIG. 9 is a cross-sectional view of a piston pump according to a fourth embodiment disclosed here.

A fourth embodiment will be explained with reference to FIG. 9. As shown in FIG. 9, a restriction portion 324 including pawls 321b may be provided at both axial ends of the feed ring 21. According to the fourth embodiment, the restriction portion of the first embodiment shown in FIG. 1 and the restriction portion of the third embodiment shown in FIG. 7 are provided to restrict the radial displacement of the feed ring 21 at both of the axial ends, respectively, and to restrain an inclination of the feed ring 21 relative to the axial center of the piston. Accordingly, the assembling performance is further enhanced so that the piston and the feed ring are assembled to the housing more readily and stably.

The piston pumps of the embodiments may be applied to a hydraulic pressure source of a brake hydraulic pressure control apparatus for an automobile which is required to excel in a response for increasing a pressure, a hydraulic pressure source of a brake hydraulic pressure control apparatus mounted to a vehicle other than an automobile, and a hydraulic pressure source for a hydraulic pressure apparatus for an industrial machinery.

According to the embodiments, the outer periphery of the piston 12 includes the bottom of the annular groove 13.

According to the embodiments, because the smaller the radial clearance dimension between the outer periphery of the piston 12 and the restriction portion 24 is, the smaller the radial displacement amount of the feed ring 21 from the center of the piston, the radial clearance dimension between the outer periphery of the piston 12 and the restriction portion 24 may be defined as small as possible within a range not to interfere an axial relative movement between the piston 12 and the feed ring 21 in order to open and close the valve portion 23.

The embodiments of the piston pump will be listed hereinafter. First, the plural pawls protruding axially from the annular base portion of the feed ring are provided on the feed ring at intervals in the circumferential direction, the plural pawls are provided as pawls which are configured to contact the outer peripheral surface of the piston, and the plural pawls serve as the restriction portion. According to the foregoing structure, the axial length L of the portion of the pawl which is configured to contact the outer periphery of the piston may be defined to be greater than the axial moving stroke s which the feed ring is allowed to move in the annular groove. Second, the plural pawls protruding from the annular base portion of the feed ring are provided on the feed ring at intervals in the circumferential direction, each of the plural pawls includes a protruding portion which is configured to contact the bottom of the annular groove at a protruding end thereof, and the plural pawls serve as the restriction portion. Third, the pawl protrudes to the rear portion side of the piston, and the pawl includes the wall to be pressured to which the pressure wall is configured to contact to transmit the forward thrust of the piston to the feed ring. Fourth, the piston includes the flange having the piston side seat surface of the valve portion, the flange is provided at the outer periphery of the piston positioned close to the front portion side of the piston compared to the annular groove, and the pawl protrudes to the front portion side of the piston and positioned to so as to come in contact with the outer peripheral surface of the flange. Fifth, the piston pump includes the restriction portion which includes the pawl protruding to the rear portion side of the piston and the restriction portion which includes the pawl protruding to the front portion side of the piston. Sixth, the feed ring is made of resin.

According to the embodiments, the feed ring 21 includes the plural pawls 21b axially protruding from the annular base portion 21a of the feed ring 21 and arranged at intervals in a circumferential direction, the plural pawls 21b are configured to contact the outer periphery of the piston 12, and the plural pawls 21b serve as the restriction portion 24.

Further, according to the embodiment, the feed ring 21 includes the plural pawls 21b axially protruding from the annular base portion 21a of the feed ring 21 and arranged at intervals in a circumferential direction, each of the plural pawls 21b includes the protruding portion 21c configured to contact the bottom of the annular groove 13 at a protruding end thereof, and the plural pawls 21b serve as the restriction portion 24.

Still further, according to the embodiments, the axial length of the portion of the pawl 21b which is configured to contact the outer periphery of the piston 12 is defined to be greater than the axial moving stroke length which the feed ring 21 is allowed to stroke in the annular groove 13.

According to the embodiments, the pawl 21b protrudes to the rear portion side of the piston 12, and the pawl 21b includes the wall 26 to be pressured which transmits a forward thrust of the piston 12 to the feed ring 21 by contacting the pressure wall 13b formed on the piston 12 at the rear portion side thereof.

According to the embodiments, the piston 12 includes the flange 12c having the piston side seat surface 23a of the valve portion 23 at the outer periphery of the piston at the forward side relative to the annular groove 13, and the pawls 21b protrude to the front portion side of the piston 12 to be provided at a position so as to come in contact with the outer peripheral surface of the flange 12c.

According to the embodiment, the restriction portion 24 which includes the pawls protruding to the rear portion side of the piston 12 and the restriction portion 24 which includes the pawls protruding to the front portion side of the piston 12 are provided.

According to the embodiments, the feed ring 21 is made of resin.

According to the embodiments of the piston pump, the restriction portion which is configured to contact the outer peripheral surface of the piston or the bottom of the annular groove is provided at the feed ring, and the radial displacement of the feed ring on the piston is restricted by the restriction portion. Accordingly, the radial displacement amount of the feed ring is reduced compared to the known structure which does not include the restriction portion, and the assembling performance of the piston and the feed ring to the housing is enhanced because cases that the feed ring is caught at an entrance of the assembling hole, when the feed ring is assembled to the housing, is reduced.

Further, because the radial displacement of the feed ring from the center of the piston is restrained, when the feed ring is assembled to the housing, it is avoided that the feed ring is dislocated from the annular groove at the outer periphery of the piston and jammed between the piston and the housing. Accordingly, the drawback that the feed ring is damaged and the durability of the feed ring is declined is resolved.

Further, by forming the restriction portion with pawls which protrude in the axial direction, an elastic deformation ability of the pawls can be enhanced by adjusting a width and a thickness, or the like, of a base portion of the pawl. Thus, by enhancing the elastic deformation ability, the feed ring is mounted to the piston without applying a large load to the feed ring.

An inner diameter of the feed ring is defined to be smaller than an external diameter of the piston, the inner diameter of the feed ring is elastically deformed to expand, and the feed ring is mounted to the annular groove provided at the outer periphery of the piston in a state where the inner diameter of the feed ring is expanded by the elastic deformation. Thereafter, the feed ring is elastically restored to have the original inner diameter, and the flexed portion of the feed ring is contacted to a lateral surface of the annular groove so as not to be disengaged from the annular groove by a snap fit structure. Because the feed ring is readily elastically deformed by forming the restriction portion with the pawls, the feed ring can be readily mounted to the piston.

The foregoing advantages that the feed ring is readily mounted to the piston is attained for both of the constructions that the pawl is configured to engage with the outer periphery of the piston other than the annular groove and that the pawl is configured to engage with the bottom of the annular groove provided at the piston. According to the former construction, the axial length L of the portion of the pawl which is configured to contact the outer periphery of the piston is defined to be greater than the axial moving stroke s which the feed ring is allowed to move in the annular groove. According to this construction, the restriction by the restriction portion is not released even if the feed ring moves to the maximum in the axial direction in the annular groove, and thus the advantages of the foregoing construction is stably exhibited.

With the construction that the pawls protrude to the rear portion side of the piston, the intake side passage which is opened and closed by the valve portion is not narrowed by the restriction portion. Further, according to this construction, flowing the entire volume of the fluid sucked to the feed chamber through the clearance between the pawls (i.e., a portion of the sucked fluid flows through the passage within the piston) is not required, and thus the intake performance of the fluid to the feed chamber is readily enhanced.

According to the foregoing construction, the wall to be pressured which receives the forward thrust of the piston by contacting the pressure wall formed on the piston is provided at the pawl. The wall to be pressured may be formed on the protruding portion which is provided at the axial intermediate portion of the radial inner surface of the pawl in a case where the pawl is configured to engage with the portion of the outer periphery of the piston other than the annular groove. Further, in a case where the pawl is configured to engage with the bottom of the annular groove, the protruding end of the pawl may serve as the wall to be pressured.

The pawls serving as the restriction portion may protrude to the front portion side of the piston. As disclosed in Patent reference 2, by providing the flange having the piston side seat surface of the valve portion, which opens and closes the suction side passage, on the outer periphery of the piston positioned at the forward side relative to the annular groove to which the feed ring is fitted), the inner diameter of the feed ring is expanded to increase the cross-sectional dimension of the passage at the inner diameter side. Further, by providing the pawls to the positions which come in contact with the external peripheral surface of the flange, radial displacement of the feed ring is prevented while increasing the cross-sectional dimension of the passage.

With the construction that both the restriction portion including the pawls protruding to the rear portion side of the piston and the restriction portion including the pawls protruding to the front portion side of the piston are provided, because the radial displacement is restricted at both axial ends of the feed ring, the positioning relative to the center of the piston is stable and the assembling performance is enhanced.

With the construction that the feed ring is made of resin, durability is readily secured compared to the feed ring made of rubber. Further, by forming the feed ring with resin, the strength of the restriction portion is also readily ensured, and thus stable displacement restriction is conducted even if the dimension of the restriction portion is relatively small.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A piston pump, comprising:
a pump mechanism configured to compress fluid sucked from an inlet port by increasing or decreasing a volume of a pump chamber which faces a front end of a piston by reciprocating the piston housed in a housing, the pump mechanism configured to discharge the compressed fluid from an outlet port;
a feed mechanism including a feed ring mounted to an annular groove provided at an outer periphery of the piston and following a motion of the piston, a feed chamber formed between the feed ring and the housing, and a valve portion selectively opening and closing an inlet side passage of the feed chamber by selectively contacting and separating the feed ring and the piston;
the feed mechanism provided at an intake passage which is configured to communicate the intake port with the pump chamber, a portion of the intake passage being formed between an inner peripheral surface of the feed ring and a bottom of the annular groove, the valve portion being closed and the volume of the feed chamber being reduced to pressure-feed the fluid in the feed chamber into the pump chamber during an intake stroke by the piston;
a surface of the annular groove being an axially facing pressure wall provided at the piston and configured to contact the feed ring to axially move the feed ring;
a restriction portion comprising plural pawls protruding axially from an annular base portion of the feed ring
the plural pawls being arranged at intervals in a circumferential direction;
a base end of the plural pawls possessing a width in a radial direction, and a base end of the annular base portion also possessing a width in a radial direction, the width of the base end of the plural pawls being smaller than the width of the base end of the annular base portion;
a radial inner surface of each of the pawls including, at an intermediate portion in an axial direction of the pawl, a wall to be pressured which is positioned in the annular groove and which is configured to be pressed by the pressure wall provided at the piston so that the feed ring follows movement of the piston in response to the pressure wall pressing the wall to be pressured;
each of the pawls possessing a radial inner surface, a portion of the radial inner surface of each pawl which is positioned distal of the wall to be pressured being configured to contact an outer peripheral surface of the piston other than the annular groove to restrict radial displacement of the feed ring; and
wherein an axial length of the portion of the radial inner surface of each pawl which is configured to contact the outer peripheral surface of the piston other than the annular groove is greater than a maximum axial moving stroke length which the feed ring is allowed to stroke in the annular groove.

2. The piston pump according to claim 1, wherein each of the plural pawls protrudes to a rear portion side of the piston.

3. The piston pump according to claim 1, wherein the piston includes a flange having a piston side seat surface of the valve portion at an outer periphery of the piston at a forward side relative to the annular groove, and the plural pawls protrude to a front portion side of the piston to be provided at a position so as to come in contact with an outer peripheral surface of the flange.

4. The piston pump according to claim 1, wherein the restriction portion includes the plural pawls protruding to the a rear portion side of the piston and the restriction portion also includes plural pawls protruding to the front portion side of the piston are provided.

5. The piston pump according to claim 1 wherein the feed ring is made of resin.

6. The piston pump according to claim 1, wherein each of the plural pawls protrudes to the rear portion side of the piston.

7. The piston pump according to claim 6 wherein the feed ring is made of resin.

8. The piston pump according to claim 1, wherein the feed ring is made of resin.

9. The piston pump according to claim 2 wherein the feed ring is made of resin.

10. The piston pump according to claim 3 wherein the feed ring is made of resin.

11. The piston pump according to claim 4 wherein the feed ring is made of resin.

12. A piston pump, comprising:
a pump mechanism configured to compress fluid sucked from an inlet port by increasing or decreasing a volume of a pump chamber which faces a front end of a piston by reciprocating the piston housed in a housing, the pump mechanism configured to discharge the compressed fluid from an outlet port;
a feed mechanism including a feed ring mounted to an annular groove provided at an outer periphery of the piston and following a motion of the piston, a feed chamber formed between the feed ring and the housing, and a valve portion selectively opening and closing an inlet side passage of the feed chamber by selectively contacting and separating the feed ring and the piston;
the feed mechanism provided at an intake passage which is configured to communicate the intake port with the pump chamber, a portion of the intake passage being formed between an inner peripheral surface of the feed ring and a bottom of the annular groove, the valve portion being closed and the volume of the feed chamber being reduced to pressure-feed the fluid in the feed chamber into the pump chamber during an intake stroke by the piston;
a pressure wall provided at the piston and configured to contact the feed ring to axially move the feed ring;
a restriction portion provided at the feed ring and configured to engage with an outer periphery of the piston at a position approximate to the pressure wall for restricting a radial displacement of the feed ring on the piston;
wherein the feed ring includes plural pawls axially protruding from an annular base portion of the feed ring and arranged at intervals in a circumferential direction, the plural pawls are configured to contact the outer periphery of the piston, and the plural pawls serve as the restriction portion; and
wherein an axial length of the portion of the radial inner surface of each pawl which is configured to contact the outer peripheral surface of the piston other than the annular groove is greater than a maximum axial moving stroke length which the feed ring is allowed to stroke in the annular groove.

* * * * *